Dec. 23, 1924.

T. V. S. DORSEY

NUT LOCK

Filed Aug. 28, 1923

1,520,567

Inventor
Thomas V. S. Dorsey.

By
Attorney

Patented Dec. 23, 1924.

1,520,567

UNITED STATES PATENT OFFICE.

THOMAS V. S. DORSEY, OF LOCKPORT, LOUISIANA.

NUT LOCK.

Application filed August 28, 1923. Serial No. 659,817.

*To all whom it may concern:*

Be it known that I, THOMAS V. S. DORSEY, a citizen of the United States, residing at Lockport, in the parish of La Fourche, State of Louisiana, have invented certain new and useful Improvements in Nut Locks; and I do hereby declare the following to be a full, clear, and exact description of the invention, such as will enable others skilled in the art to which it appertains to make and use the same.

This invention relates to new and useful improvements in locking devices, and particularly to devices for locking bolts and nuts against retrograde rotation.

One object of the invention is to provide a device of this character wherein is used a split washer ring, and wherein the nut may be easily and quickly released from the washer ring, without the aid of special tools for compressing the washer ring.

Another object is to provide a nut locking device wherein a toothed ring is engaged threadedly by the nut, and the spring washer ring engaged by the toothed ring, whereby the toothed ring can be pressed firmly into engagement with the split ring, and wherein the nut may be easily and quickly removed to permit the toothed ring to be readily released from the split ring.

Other objects and advantages will be apparent from the following description when taken in connection with the accompanying drawing.

Figure 1:
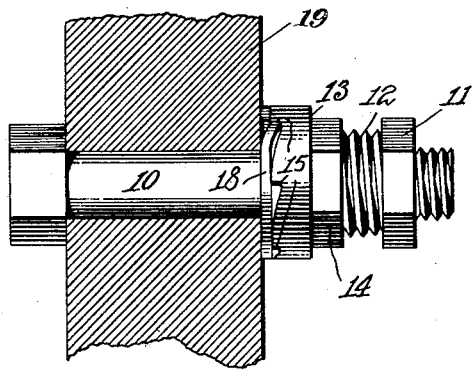
Figure 1 is a side elevation of the device in locked position.
Figure 2:
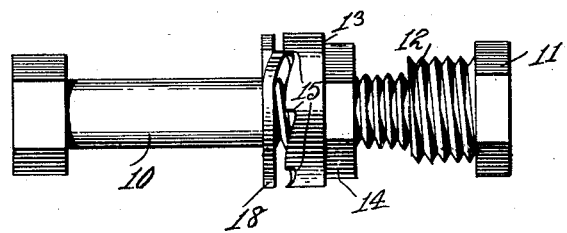
Figure 2 is a side elevation of the device in unlocked, and separated position.
Figure 3:
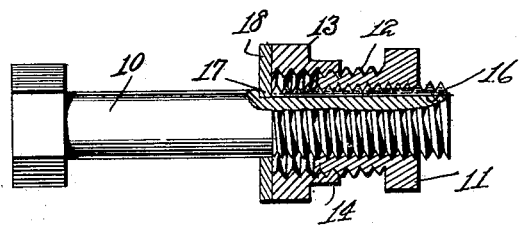
Figure 3 is a longitudinal sectional view through the device, the bolt, however, being shown in elevation.

Referring particularly to the accompanying drawing, 10 represents a bolt having one end threaded. Threaded onto the end of the bolt is a nut 11 which is formed with the tubular extension 12, having its external face provided with threads of a pitch different from those of the bolt 10. Threaded on this extension, and encircling the bolt, is a ring 13, said ring having the wrench engaging faces 14, and having its work directed face formed with the ratchet teeth 15. Longitudinally of the bolt, and through the threaded end thereof, is a groove 16, which receives the lug 17 of the split spring washer ring 18, said washer ring being disposed in encircling relation to the bolt, and arranged to bear against the work 19.

The ring 13 is first engaged on the extension of the nut 11, after which the nut is screwed onto the bolt until the teeth of the ring engage with the washer ring. The nut 11 is then held against turning while the ring 13 is screwed toward the washer ring, and until a firm engagement is had. The lug of the washer ring maintains the ring and bolt against relative rotation, and when the ring 13 is engaged with the washer ring, and the nut 11 screwed to the desired position, none of the parts will be capable of retrograde rotation. To the above factors is added that of the difference in pitch of the threads of the bolt 10 and the nut 11. When the member 13 is turned tightly against the washer 18, the threads thereof will bind on the threads of the exterior of the member 11, and in view of the fact that the difference in pitch between the threads of the exterior of the member 11 and the exterior of the bolt 10 permits the member 13 to travel faster than the member 11, any tendency of the member 11 to back off will result in the binding of the members 11 and 13, together, and the threads of the member 11 to bind with the threads of the bolt. The washer 18 being in fixed relation to the bolt, and the member 13 clutched to the member 18, any tendency of the member 11 to turn in a retrograde direction will be effectively prevented.

To release the device the nut 11 is turned toward the work, and as a result of the greater pitch of the external threads of the extension 12, the ring 13 will move away from the ring 19. When the end of the ring 18 is free of the notch 15, of the ring 13, said ring and the nut 11, may be backed from the bolt, as a unit.

It will be noted that the ring 13 does not contact with the bolt, thus permitting the same to be easily slipped out of contact with the split washer ring, when the nut is properly unscrewed.

What is claimed is:

1. In a nut locking device, the combination with a bolt having a longitudinally grooved threaded portion, and a coil spring washer thereon having a lug engaged in said groove, of a nut engaged on the bolt, the threads of the nut being of different pitch and a member adjustable on the nut and engaged with the spring washer.

2. In a nut locking device, the combination with a longitudinally grooved bolt having a coil spring washer thereon and engaged with the groove, of an internally and externally threaded nut engaged on the bolt, the internal and external threads of the nut being of different pitch, and a toothed member threadedly engaged on the nut and engaged with the coil spring washer.

3. In a nut locking device, the combination with a grooved bolt having a coil spring washer thereon and engaged within the groove, of a nut threaded on the bolt and having an externally threaded extension, the threads of which are of different pitch from the threads of the bolt, and a ring threadedly engaged on the extension and having a toothed end face engaged with one end of the spring washer.

In testimony whereof, I affix my signature, in the presence of two witnesses.

THOMAS V. S. DORSEY.

Witnesses:
 CLIFTON J. MASSE,
 E. L. ADAMS.